United States Patent
Patel et al.

(10) Patent No.: US 12,292,922 B2
(45) Date of Patent: May 6, 2025

(54) PROVIDING TAG SUGGESTIONS FOR AN IMAGE IN SOCIAL MEDIA PLATFORMS

(71) Applicant: International Business Machines Corporation, Armonk, NY (US)

(72) Inventors: Kushal S. Patel, Pune (IN); Gandhi Sivakumar, Mountain View, CA (US); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 18/467,763

(22) Filed: Sep. 15, 2023

(65) Prior Publication Data

US 2025/0094485 A1    Mar. 20, 2025

(51) Int. Cl.
*G06F 16/587* (2019.01)
*G06F 16/583* (2019.01)
*G06Q 50/00* (2012.01)

(52) U.S. Cl.
CPC .......... *G06F 16/587* (2019.01); *G06F 16/583* (2019.01); *G06Q 50/01* (2013.01)

(58) Field of Classification Search
CPC ...... G06F 16/587; G06F 16/583; G06Q 50/01
USPC .................................................. 707/705
See application file for complete search history.

(56) References Cited

U.S. PATENT DOCUMENTS

| | | | |
|---|---|---|---|
| 8,626,194 B2 | 1/2014 | Busch | |
| 8,788,587 B2 | 7/2014 | Balassanian et al. | |
| 8,793,285 B2* | 7/2014 | Han | G06F 40/117 |
| | | | 707/803 |
| 8,929,709 B2 | 1/2015 | Lokshin | |
| 10,242,114 B2* | 3/2019 | Mansour | G06F 16/9537 |
| 10,467,282 B2 | 11/2019 | Shorman et al. | |
| 2005/0289469 A1 | 12/2005 | Chandler et al. | |
| 2011/0087534 A1* | 4/2011 | Strebinger | G06Q 50/01 |
| | | | 705/26.7 |
| 2011/0145258 A1 | 6/2011 | Kankainen | |
| 2012/0076367 A1* | 3/2012 | Tseng | G06F 16/5838 |
| | | | 382/118 |
| 2012/0278395 A1* | 11/2012 | Garcia | G06F 16/9535 |
| | | | 709/205 |
| 2014/0280232 A1* | 9/2014 | Chidlovskii | G06F 16/58 |
| | | | 707/749 |
| 2016/0210704 A1* | 7/2016 | Fang | G06F 16/245 |

(Continued)

OTHER PUBLICATIONS

Hu J., et al., "Personalized Tag Recommendation Using Social Influence." Beihang University, Beijing 100191, China. Aug. 31, 2011. 14 Pages.

*Primary Examiner* — Joshua Bullock
(74) *Attorney, Agent, or Firm* — CANTOR COLBURN LLP; Jordan Schiller (57) ABSTRACT

A computer-implemented method for providing tag suggestions for an image in a social media platform is provided. Aspects include receiving an image from a first user of a social media platform, obtaining a timestamp corresponding to a time that the image was captured, and obtaining a geographic location corresponding to where the image was captured. Aspects also include identifying one or more members of the social media platform that are connected to the first user that were within a predefined distance of the geographic location at the time that the image was captured and providing a list of the one or more members to the first user as suggestions for tagging the image.

17 Claims, 5 Drawing Sheets

(56) References Cited

U.S. PATENT DOCUMENTS

| | | | |
|---|---|---|---|
| 2016/0239724 A1* | 8/2016 | Arfvidsson | H04L 67/10 |
| 2017/0103130 A1* | 4/2017 | Roy | G06Q 50/01 |
| 2017/0206196 A1* | 7/2017 | Raichelgauz | H04N 21/25891 |
| 2019/0385243 A1* | 12/2019 | Childers | G06F 16/9535 |
| 2020/0183996 A1* | 6/2020 | DeLuca | G06F 16/90324 |

* cited by examiner

PROVIDING TAG SUGGESTIONS FOR AN IMAGE IN SOCIAL MEDIA PLATFORMS

BACKGROUND

The present invention generally relates to social media platforms, and more specifically, to providing tag suggestions for an image on a social media platform.

Social media networks are often used to share images and photographs. Often, after a user uploads an image to a social media platform, the user is presented with an option to tag the image. Tagging an image or photograph involves linking the name and associated social media profile of another individual to the image. A tag is essentially a clickable name that appears in the caption of a photo. When a user rolls their cursor over the photo that has tagged users in it, the user will see those users' names appear over the photo (often over their faces).

Often, when a user uploads an image to a social media platform, the social media platform identifies the faces of individuals shown in the image and performs a facial recognition comparison algorithm between the direct contacts, or friends, of the user and the faces of individuals shown in the image. Based on the results of the facial recognition comparison algorithm, the social media platform then provides tagging recommendations to the user.

SUMMARY

Embodiments of the present invention are directed to a computer-implemented method for providing tag suggestions for an image in a social media platform. The computer-implemented method includes receiving an image from a first user of a social media platform, obtaining a timestamp corresponding to a time that the image was captured, and obtaining a geographic location corresponding to where the image was captured. The method also includes identifying one or more members of the social media platform that are connected to the first user that were within a predefined distance of the geographic location at the time that the image was captured and providing a list of the one or more members to the first user as suggestions for tagging the image.

Embodiments of the present invention are directed to a computer program product for providing tag suggestions for an image in a social media platform. The computer program product includes one or more computer readable storage media having computer readable program code collectively stored on the one or more computer readable storage media. The computer readable program code is executed by a processor of a computer system to cause the computer system to perform operations. The operations include receiving an image from a first user of a social media platform, obtaining a timestamp corresponding to a time that the image was captured, and obtaining a geographic location corresponding to where the image was captured. The operations also include identifying one or more members of the social media platform that are connected to the first user that were within a predefined distance of the geographic location at the time that the image was captured and providing a list of the one or more members to the first user as suggestions for tagging the image.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform operations. The operations include receiving an image from a first user of a social media platform, obtaining a timestamp corresponding to a time that the image was captured, and obtaining a geographic location corresponding to where the image was captured. The operations also include identifying one or more members of the social media platform that are connected to the first user that were within a predefined distance of the geographic location at the time that the image was captured and providing a list of the one or more members to the first user as suggestions for tagging the image.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, when a user uploads an image to a social media platform, the social media platform utilizes a facial recognition comparison algorithm to provide tagging recommendations to the user. The tagging recommendations are identified by comparing facial images of the direct contacts, or friends, of the user to the faces of individuals shown in the uploaded image. In general, such facial recognition comparison algorithms are computationally complex and require substantial computing power to execute. The resources required for performing the facial recognition comparison algorithm increase as the number of direct contacts, or friends, of the user increases. In addition, the use of such facial recognition comparison algorithms fails to identify indirect contacts, or friends-of-friends, that are shown in the uploaded image.

Embodiments of the present invention are directed to a computer-implemented method for providing tag suggestions for an image in a social media platform. The computer-implemented method includes receiving the image from a first user of the social media platform, obtaining a timestamp corresponding to a time that the image was captured, and obtaining a geographic location corresponding to where the image was captured. The method also includes identifying one or more members of the social media platform that are connected to the first user that were within a predefined distance of the geographic location at the time that the image was captured and providing a list of the one or more members to the first user as suggestions for tagging the image. One technical benefit of utilizing timestamp and location data to generate tagging suggestions for an image is the elimination of the user of computationally complex facial recognition algorithms.

Additionally, or alternatively, in embodiments of the present invention a member of the social media platform is determined to be connected to the first user based on a pre-existing direct relationship between the first user and the member. As a result, the speed of identifying tagging suggestions can be increased by reducing the number of records that need to be compared to the timestamp and geographic location of the image.

Additionally, or alternatively, in embodiments of the present invention a member of the social media platform is determined to be connected to the first user based on a pre-existing indirect relationship between the first user and the member. As a result, the number of tagging suggestions can be increased by considering indirectly related members of the social media platform.

Additionally, or alternatively, in embodiments of the present invention the list is an ordered list of the one or more members and wherein the order is determined based on a distance between each of the one or more members at the time the image was captured and the geographic location. As a result, the tagging suggestions can be presented such that the most likely candidates are presented to the user first.

Additionally, or alternatively, in embodiments of the present invention the order is further determined based on a degree of separation of the first user and each of the one or more members. As a result, the tagging suggestions can be presented such that the most likely candidates are presented to the user first.

Additionally, or alternatively, in embodiments of the present invention at least one of the timestamp and the geographic location are obtained from metadata of the image. As a result, the communications between the social media platform and the user device can be reduced, which will result in faster completion of the generation of the list of tagging suggestions.

Additionally, or alternatively, in embodiments of the present invention at least one of the timestamp and the geographic location are obtained by querying a device used by the first user to transmit the image to the social media platform. As a result, the reliability of the timestamp data and the location data is increased.

Additionally, or alternatively, in embodiments of the present invention the social media platform is configured to periodically obtain a location of an electronic device associated with each of the members of the social media platform. As a result, the social media platform can create and maintain a membership location history that is utilized for performing generation of tagging suggestions.

Additionally, or alternatively, in embodiments of the present invention the social media platform is configured to delete the location of the electronic device associated with each of the members of the social media platform once a duration of time has passed since the location of the electronic device was obtained. As a result, the size of the membership location history is prevented from becoming too large.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
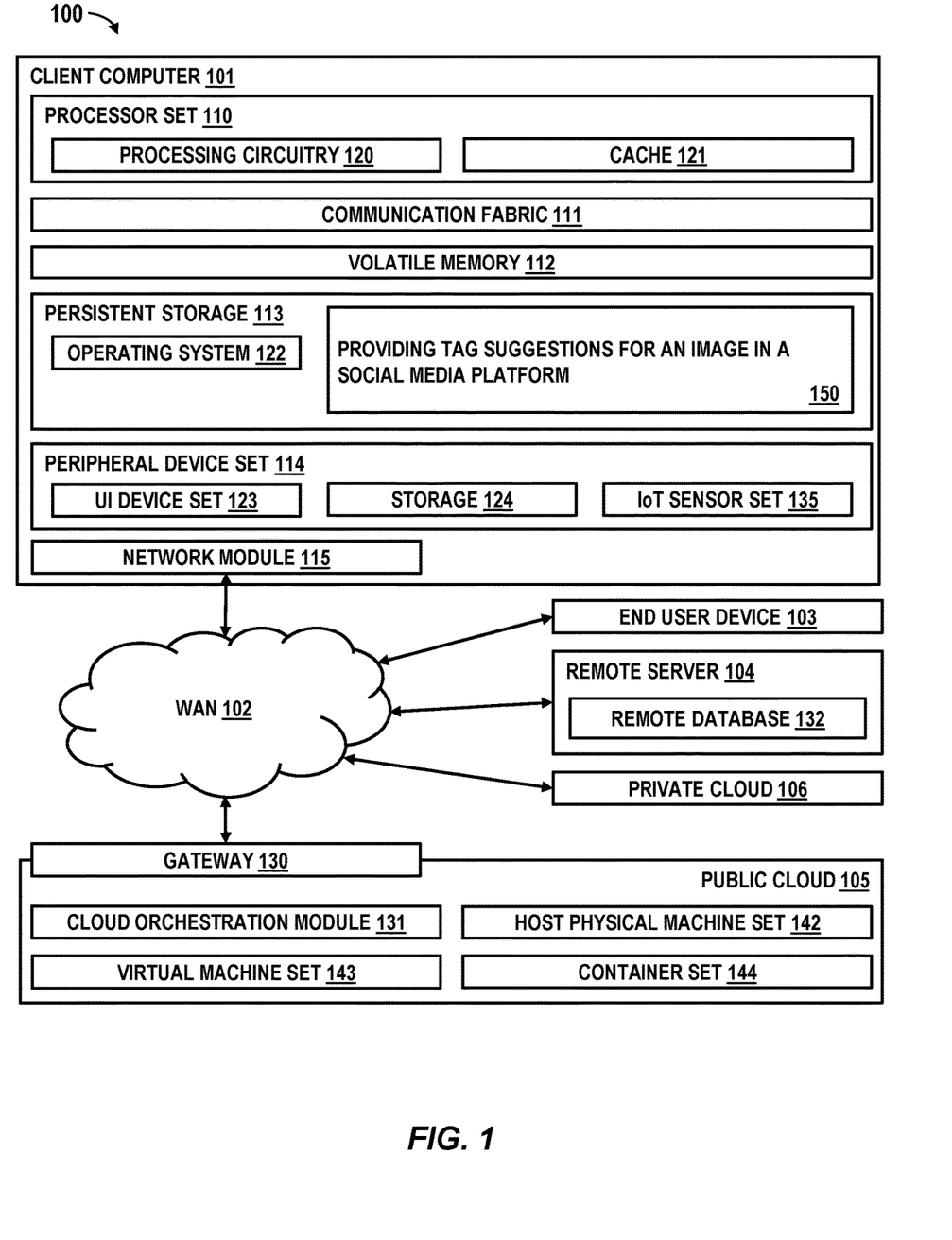
FIG. 1 is a schematic diagram of a computing environment in accordance with one or more embodiments of the present invention.

Computing environment 100 contains an example of an environment for the execution of at least some of the computer code involved in performing the inventive methods, such as providing tag suggestions for an image in a social media platform (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 135), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 135 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
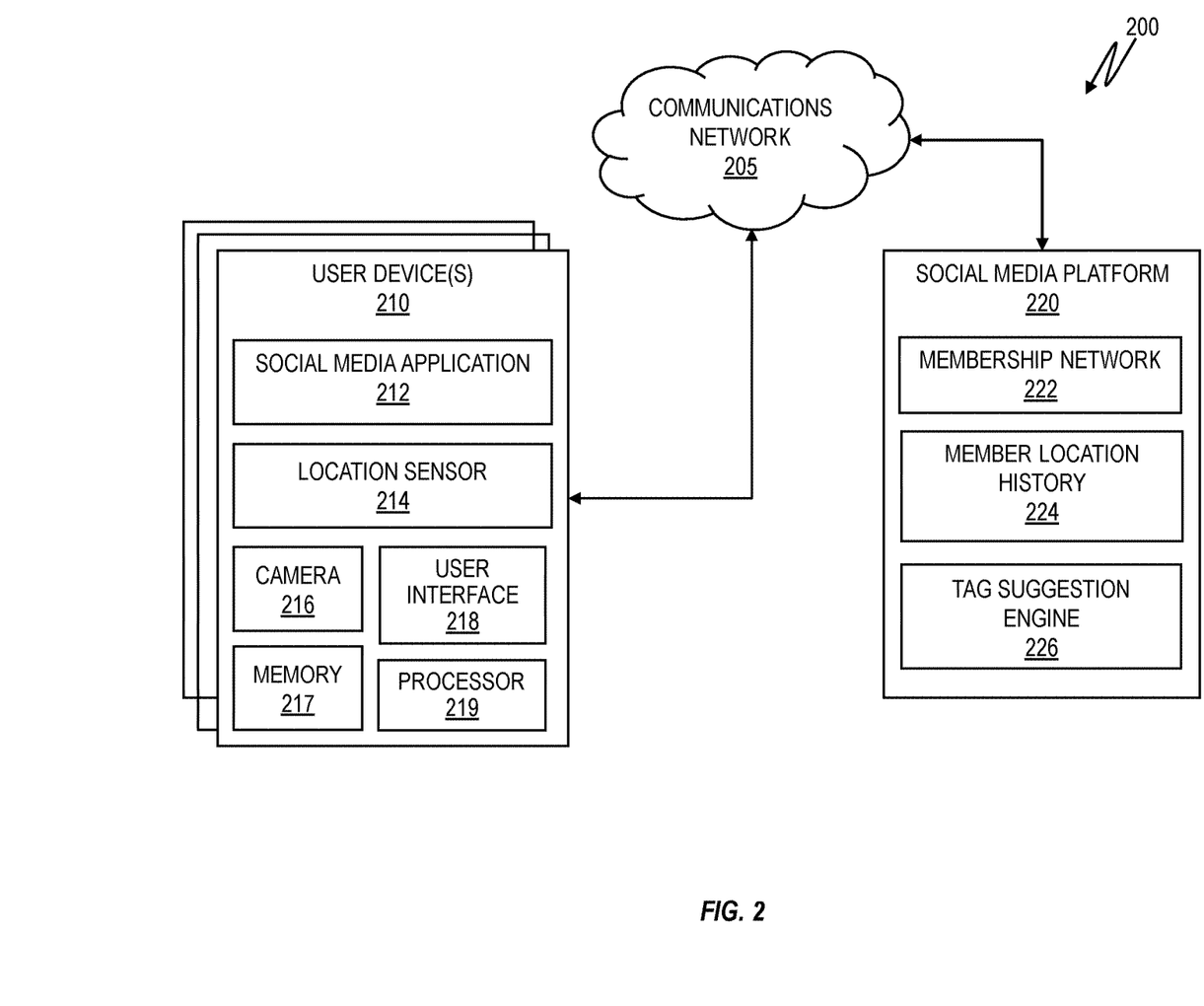
FIG. 2 is a block diagram illustrating a system for providing tag suggestions for an image in a social media platform in accordance with one or more embodiments of the present invention.

Referring now to FIG. 2, a block diagram illustrating a system 200 for providing tag suggestions for an image in a social media platform in accordance with one or more embodiments of the present invention is shown. As illustrated, the system 200 includes a plurality of user devices 210 that are in communication with a social media platform 220 via a communications network 205. The communications network 205 may include one or more private networks, public networks (such as the Internet), or a combination of both public and private networks. In exemplary embodiments, the social media platform 220 is embodied in a computer 101 such as the one shown in FIG. 1. In exemplary embodiments, the plurality of user devices 210 can include tablets, smartphones, personal computers, or the like.

In exemplary embodiments, each user device 210 includes a camera 216 that is configured to capture images and a memory 217 that is configured to store the captured images. In one embodiment, the user device 210 includes a processor 219 that is configured to generate metadata for each image captured by the camera 216 and to store the metadata in the memory 217 along with the image. In one embodiment, the metadata is appended to the image file for the captured image in the memory. The metadata can include a geographic location of the user device 210 that is obtained from a location sensor 214, such as a global positioning system (GPS) sensor. The metadata can also include a timestamp that indicates a date and time that the camera 216 of the user device 210 captured the image. The user device 210 also includes a user interface 218, such as a touchscreen display, that facilitates the operation of the user device 210.

In exemplary embodiments, each user device 210 also includes a social media application 212 that is configured to communicate with the social media platform 220. Among other functionalities, the social media application 212 is configured to allow a user to upload an image to the social media platform 220. Once a user uploads an image to the social media platform 220, via the social media application 212, the social media application 212 is configured to obtain a list of tagging suggestions from the social media platform 220 and present the list to the user via the user interface 218. Next, the social media application 212 is configured to receive tagging selections from the user via the user interface. The tagging selections are received by the social media application 212 and then provided to the social media platform 220, which applies the selected tags to the image stored by the social media platform 220.

In exemplary embodiments, the social media platform 220 includes a membership network 222, a member location history 224, and a tag suggestion engine 226. In exemplary embodiments, the membership network 222 is a structure graph that includes nodes that represent members of the social media platform 220 and edges that represent connections between the members of the social media platform 220.

In exemplary embodiments, the member location history 224 is a data structure that is configured to store geographic location data for each member of the social media platform 220. In exemplary embodiments, the social media application 212 is configured to periodically obtain the location of the user device 210 via the location sensor 214 and to provide the location of the user device 210 to the social media platform 220. The social media platform 220 is configured to store the received location data in the member location history 224. In exemplary embodiments, the social media platform 220 is configured to automatically delete the location data in the member location history 224 after a predetermined period of time. For example, in one embodiment, the social media platform 220 is configured to only store the location history of the members of the social media platform for one week. As a result, the member location history 224 is constantly updated by adding newly received location data and deleting older location data.

In exemplary embodiments, the tag suggestion engine 226 is configured to generate a list of tag suggestions for an image uploaded to the social media platform 220 by a user device 210. In one embodiment, the tag suggestion engine 226 is configured to obtain a timestamp corresponding to when the uploaded image was captured and a geographic location of the user device 210 at the time that the uploaded image was captured. In one embodiment, the timestamp and location data are obtained from metadata included in the uploaded image. In another embodiment, the tag suggestion engine 226 is configured to communicate with the social media application 212 to obtain the timestamp and location data from the user device.

The tag suggestion engine 226 is configured to generate a list of tag suggestions for an image uploaded to the social media platform 220 by comparing the timestamp and location data of the uploaded image to the member location history 224 to identify members of the social media platform 220 that were within a predetermined distance from the location of the user device 210 at the time that the uploaded image was captured. In exemplary embodiments, the predetermined distance is a parameter that is set by an administrator of the social media platform 220. In one embodiment, the predetermined distance may be approximately fifty feet.

In exemplary embodiments, once the members of the social media platform 220 that were within the predetermined distance from the location of the user device 210 at the time that the uploaded image was captured are identified, the tag suggestion engine 226 is configured to determine a degree of the connection between a member associated with the user device and the identified members. The degree of connection represents the strength of the connection of two members of the social media platform and is obtained based on the membership network 222. In one embodiment, a first-degree connection exists between two members that are directly connected to one another (i.e., the two members are friends with one another). Likewise, a second-degree connection exists between two members who are not directly connected to one another but share one or more common connections (i.e., the two members are friends-of-friends). In exemplary embodiments, the tag suggestion engine 226 is configured to order the list of tag suggestions based at least in part on a degree of connection between the member associated with the user device 210 and the identified members that were within the predetermined distance.

Figure 3:
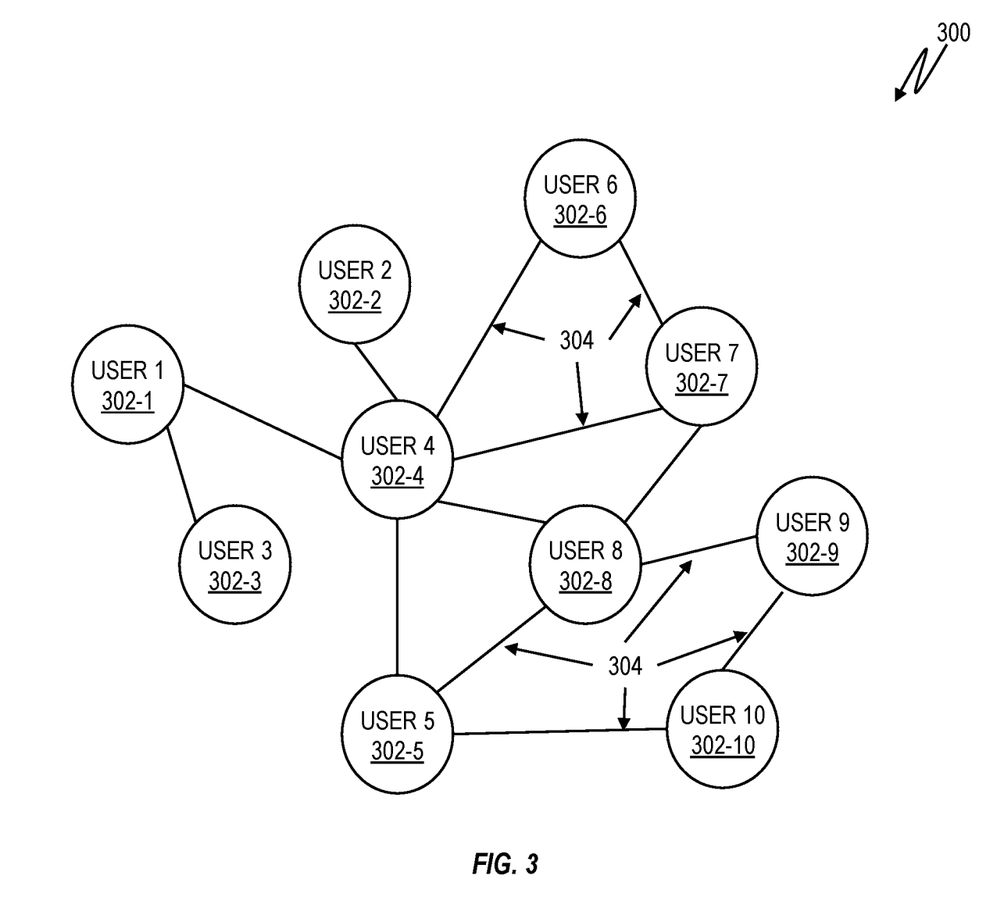
FIG. 3 is a schematic diagram illustrating a membership network of a social media platform in accordance with one or more embodiments of the present invention.

Referring now to FIG. 3, a schematic diagram illustrating a membership network 300 of a social media platform in accordance with one or more embodiments of the present invention is shown. As illustrated, the membership network 300 of a social media platform includes a plurality of nodes that each correspond to members 302-1 through 302-10, referred to collectively herein as members 302, that are each connected to at least one other by an edge 304. Each edge 304 represents a direct connection between two members 302. For example, member 302-1 is directly connected to member 304-4, in other words, member 302-1 has a first-degree connection with member 304-4. Likewise, member 302-1 is indirectly connected to member 304-2, in other words, member 302-1 has a second-degree connection with member 304-2.

Figure 4:
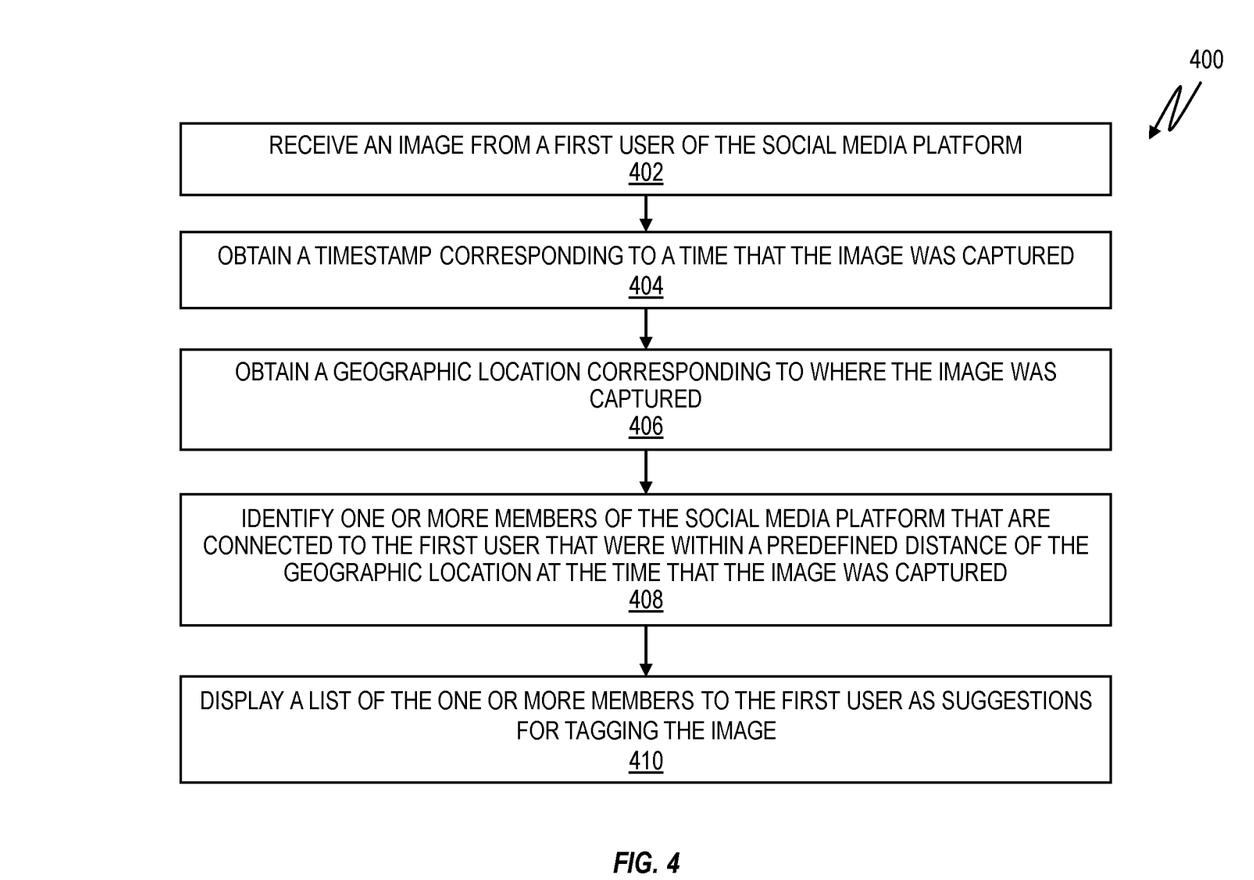
FIG. 4 is a flow diagram illustrating a computer-implemented method for providing tag suggestions for an image in a social media platform in accordance with one or more embodiments of the present invention.

Referring now to FIG. 4, a flow diagram illustrating a computer-implemented method 400 for providing tag suggestions for an image in a social media platform in accordance with one or more embodiments of the present invention is shown. In exemplary embodiments, the method 400 is performed by a social media platform 220 such as the one shown in FIG. 2.

At block 402, the method 400 begins by receiving an image from a first user of the social media platform. Next, the method 400 includes obtaining a timestamp corresponding to a time that the image was captured, as shown at block 404. At block 406, the method 400 includes obtaining a geographic location corresponding to where the image was captured. In exemplary embodiments, the image provided by the first user to the social media platform includes metadata that includes the timestamp and the geographic location. In other embodiments, the timestamp and the geographic location are obtained by the social media platform via the social media application that is installed on a user device associated with the first user. In some embodiments, the social media platform is configured to verify the geographic location of the image by comparing the location of the first user obtained from the member location history 224 for the timestamp corresponding to the image.

As shown at block 408, the method 400 also includes identifying one or more members of the social media platform that are connected to the first user that was within a predefined distance of the geographic location at the time that the image was captured. In one embodiment, a member of the social media platform is determined to be connected to the first user based on a pre-existing direct relationship between the first user and the member. In another embodiment, a member of the social media platform is determined to be connected to the first user based on a pre-existing indirect relationship between the first user and the member.

The method 400 also includes providing a list of one or more members to the first user as suggestions for tagging the image, as shown at block 410. In exemplary embodiments, the list is an ordered list of one or more members where the order is determined based at least in part on the distance between each of the one or more members at the time the image was captured and the geographic location. In one embodiment, the order of the list is further determined based on a degree of separation of the first user and each of the one or more members.

Figure 5:
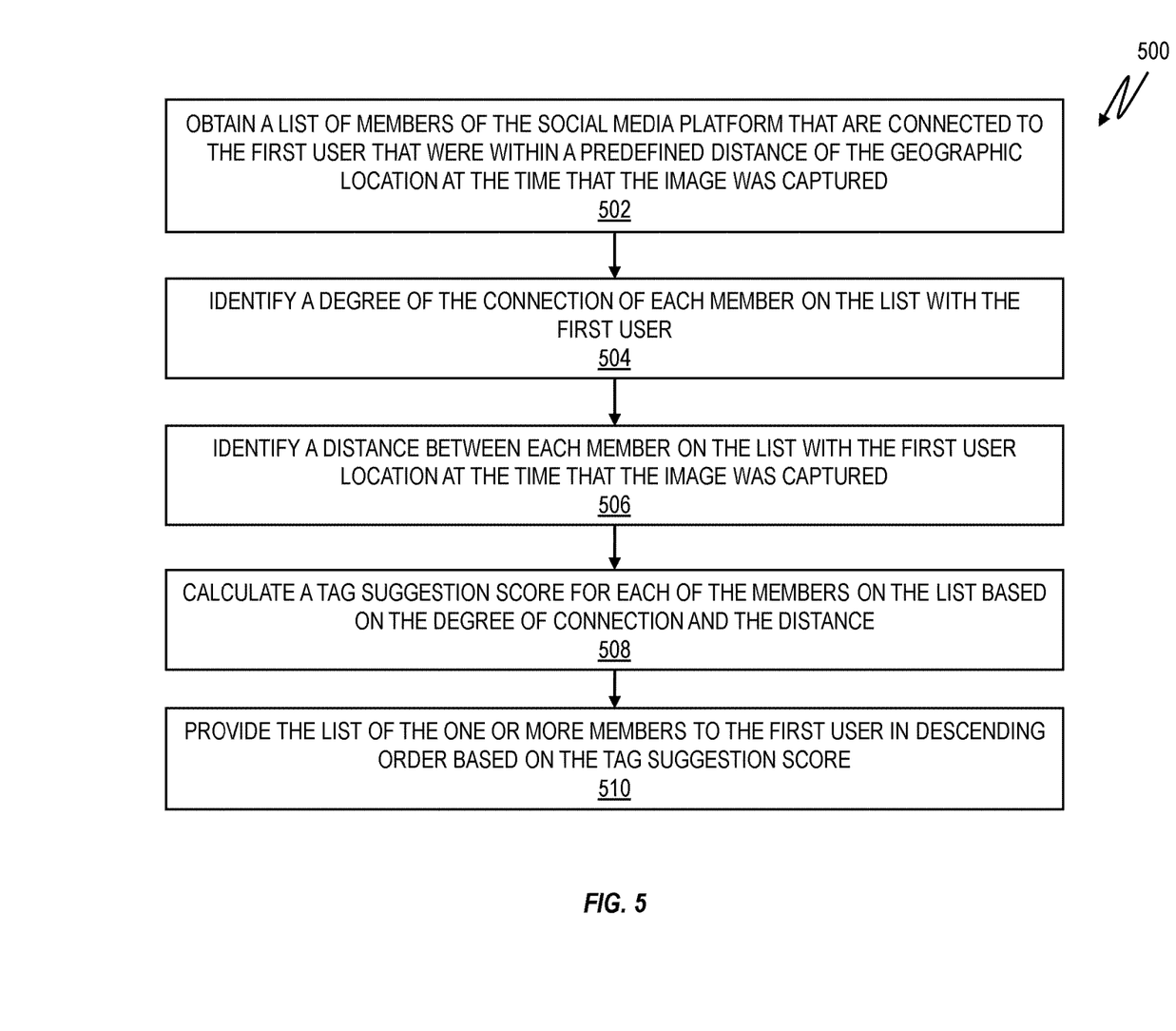
FIG. 5 is a flow diagram illustrating a computer-implemented method for ordering a list of tag suggestions for an image in a social media platform in accordance with one or more embodiments of the present invention.

Referring now to FIG. 5, a flow diagram illustrating a computer-implemented method 500 for ordering a list of tag suggestions for an image in a social media platform in accordance with one or more embodiments of the present invention is shown. In exemplary embodiments, the method 500 is performed by a social media platform 220 such as the one shown in FIG. 2.

At block 502, the method 500 includes obtaining a list of members of the social media platform that are connected to the first user and that were within a predefined distance ($D_{max}$) of the geographic location at the time that the image was captured. In one embodiment, the predefined distance ($D_{max}$) from the geographic location is set by an administrator of the social media platform. For example, $D_{max}$ may be fifty feet. Next, as shown at block 504, the method 500 includes identifying the degree of the connection (Deg.) of each member on the list with the first user. The method 500 also includes identifying a distance ($D_{act}$) between each member on the list with the first user location at the time that the image was captured, as shown at block 506. Next, as shown at block 508, the method 500 includes calculating a tag suggestion score for each of the members on the list based on the degree of connection and the distance. In one embodiment, the tag suggestion score is calculated as $(1/\text{Deg.}) - (D_{act}/D_{max})$. For example, a first-degree connection that is located ten feet away from the first user would have a tag suggestion score of 0.8 calculated based on $1/1 - (10/50)$, and a second-degree connection that is located twenty feet away from the first user would have a tag suggestion score of 0.1 calculated based on $1/2 - (20/50)$. In exemplary embodiments, another method for calculating the tag suggestion score may also be used. The method 500 concludes at block 510 by providing the ordered list of one or more members to the first user in descending order based on the tag suggestion score.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for providing tag suggestions for an image in a social media platform, the computer-implemented method comprising:
   receiving the image from a first user of the social media platform;
   obtaining a timestamp corresponding to a time that the image was captured;
   obtaining a geographic location corresponding to where the image was captured;
   creating a list of one or more members of the social media platform that are connected to the first user that were within a predefined distance of the geographic location at the time that the image was captured;
   calculating a tag suggestion score for each of the one or more members on the list, wherein the tag suggestion score is calculated based on a distance between each of the one or more members at a time the image was captured and the geographic location and based on a degree of separation of the first user and each of the one or more members;
   ordering the one or more members on the list in descending order based on the tag suggestion score; and
   providing the ordered list of the one or more members to the first user as suggestions for tagging the image,
   wherein the computer-implemented method does not utilize facial recognition during creation of the list of one or more members or to calculate the tag suggestion score for each of the one or more members on the list.

2. The computer-implemented method of claim 1, wherein a member of the social media platform is determined to be connected to the first user based on a pre-existing direct relationship between the first user and the member.

3. The computer-implemented method of claim 1, wherein a member of the social media platform is determined to be connected to the first user based on a pre-existing indirect relationship between the first user and the member.

4. The computer-implemented method of claim 1, wherein at least one of the timestamp and the geographic location are obtained from metadata of the image.

5. The computer-implemented method of claim 1, wherein at least one of the timestamp and the geographic location are obtained by querying a device used by the first user to transmit the image to the social media platform.

6. The computer-implemented method of claim 1, wherein the social media platform is configured to periodically obtain a location of an electronic device associated with each of the members of the social media platform.

7. The computer-implemented method of claim 6, wherein the social media platform is configured to delete the location of the electronic device associated with each of the members of the social media platform once a duration of time has passed since the location of the electronic device was obtained.

8. The computer-implemented method of claim 1, wherein the tag suggestion score is calculated as (1/Deg.)−(Dact/Dmax), where Dact is a distance between each member on the list with the geographic location, Dmax is the predefined distance, and Deg. is the degree of separation of the first user and each member on the list with the first user at the time that the image was captured.

9. A computer program product having one or more non-transitory computer readable storage media having computer readable program code collectively stored on the one or more computer readable storage media, the computer readable program code being executed by a processor of a computer system to cause the computer system to perform operations comprising:
   receiving an image from a first user of a social media platform;
   obtaining a timestamp corresponding to a time that the image was captured;
   obtaining a geographic location corresponding to where the image was captured;
   creating a list of one or more members of the social media platform that are connected to the first user that were within a predefined distance of the geographic location at the time that the image was captured;
   calculating a tag suggestion score for each of the one or more members on the list, wherein the tag suggestion score is calculated based on a distance between each of the one or more members at a time the image was captured and the geographic location and based on a degree of separation of the first user and each of the one or more members;
   ordering the one or more members on the list in descending order based on the tag suggestion score; and
   providing the ordered list of the one or more members to the first user as suggestions for tagging the image,
   wherein the computer-implemented method does not utilize facial recognition during creation of the list of one or more members or to calculate the tag suggestion score for each of the one or more members on the list.

10. The computer program product of claim 9, wherein a member of the social media platform is determined to be connected to the first user based on a pre-existing direct relationship between the first user and the member.

11. The computer program product of claim 9, wherein a member of the social media platform is determined to be connected to the first user based on a pre-existing indirect relationship between the first user and the member.

12. The computer program product of claim 9, wherein at least one of the timestamp and the geographic location are obtained from metadata of the image.

13. The computer program product of claim 9, wherein at least one of the timestamp and the geographic location are obtained by querying a device used by the first user to transmit the image to the social media platform.

14. The computer program product of claim 9, wherein the social media platform is configured to periodically obtain a location of an electronic device associated with each of the members of the social media platform.

15. The computer program product of claim 14, wherein the social media platform is configured to delete the location of the electronic device associated with each of the members of the social media platform once a duration of time has passed since the location of the electronic device was obtained.

16. A computing system comprising:
a processor;
a memory coupled to the processor; and
one or more computer readable storage media coupled to the processor, the one or more computer readable storage media collectively containing instructions that are executed by the processor via the memory to cause the processor to perform operations comprising:

receiving an image from a first user of a social media platform;
obtaining a timestamp corresponding to a time that the image was captured;
obtaining a geographic location corresponding to where the image was captured;
creating a list of one or more members of the social media platform that are connected to the first user that were within a predefined distance of the geographic location at the time that the image was captured;
calculating a tag suggestion score for each of the one or more members on the list, wherein the tag suggestion score is calculated based on a distance between each of the one or more members at a time the image was captured and the geographic location and based on a degree of separation of the first user and each of the one or more members;
ordering the one or more members on the list in descending order based on the tag suggestion score; and
providing the ordered list of the one or more members to the first user as suggestions for tagging the image,
wherein the computer-implemented method does not utilize facial recognition during creation of the list of one or more members or to calculate the tag suggestion score for each of the one or more members on the list.

17. The computer system of claim 16, wherein a member of the social media platform is determined to be connected to the first user based on a pre-existing direct relationship between the first user and the member.

* * * * *